United States Patent [19]

Iovine et al.

[11] Patent Number: 4,948,822
[45] Date of Patent: Aug. 14, 1990

[54] LAMINATING ADHESIVES

[75] Inventors: Carmine P. Iovine, Bridgewater; James L. Walker, Whitehouse Sta., both of N.J.

[73] Assignee: National Starch and Chemical Investment Holding Corporation, Wilmington, Del.

[21] Appl. No.: 315,985

[22] Filed: Feb. 27, 1989

[51] Int. Cl.$^5$ .............................................. C08F 83/00
[52] U.S. Cl. ..................................... 523/201; 525/902; 524/804
[58] Field of Search .......................... 523/201; 525/902

[56] References Cited

U.S. PATENT DOCUMENTS

| | | | |
|---|---|---|---|
| 3,905,931 | 9/1975 | Ziegert | 260/29.6 NR |
| 3,978,261 | 8/1976 | Ford et al. | 428/212 |
| 4,091,162 | 5/1978 | Henderson et al. | 428/327 |
| 4,226,752 | 11/1980 | Erickson et al. | 524/460 |
| 4,264,678 | 4/1981 | Nelson | 428/407 |
| 4,351,875 | 9/1982 | Arkens | 428/290 |
| 4,421,901 | 12/1983 | Lindner et al. | 525/902 |
| 4,473,679 | 9/1984 | Falk et al. | 524/432 |
| 4,616,057 | 10/1986 | Lindemann et al. | 524/458 |
| 4,617,343 | 10/1986 | Walker et al. | 524/817 |
| 4,666,777 | 5/1987 | Ash et al. | 428/407 |
| 4,680,335 | 7/1987 | Chambers et al. | |

FOREIGN PATENT DOCUMENTS

| | | | |
|---|---|---|---|
| 0187650 | 7/1986 | European Pat. Off. | 525/902 |
| 2033991 | 3/1977 | Japan | 525/902 |

OTHER PUBLICATIONS

J. Appl. Polymer Sci., vol. 31, pp. 1075-1082, (1986), Morphology of Composite Emulsion Particles Consisting of Two Kinds of Polymers Between Which Ionic Bonding Intemolecular Interaction Operates, M. Okubo, et al.

*Primary Examiner*—Joseph L. Schofer
*Assistant Examiner*—Mark D. Sweet
*Attorney, Agent, or Firm*—Edwin M. Szala; Ellen T. Dec

[57] ABSTRACT

Laminating adhesives are described for forming flexible laminates having high bond strength, and a high degree of both humidity and water resistance. The one-part laminating adhesive compositions incorporate acrylic polymer emulsions prepared by a "core-shell" multistage polymerization process.

6 Claims, No Drawings

LAMINATING ADHESIVES

BACKGROUND OF THE INVENTION

The present invention is directed to laminating adhesive compositions suitable for use in various laminating applications. The adhesives are prepared and employed in emulsion form and on removal of the aqueous medium and organic solvent, if any, subsequent to application, the adhesives will cure or harden at room temperature to form a flexible laminate having high bond strength, heat resistance, and a high degree of both humidity and water resistance.

The adhesives are useful to provide laminae of woven and non-woven fabrics where the fabric itself is of cotton, polyolefin, polyester, polyamide (nylon), etc.; coated and uncoated paper and paperboard; films such, for example, as polyvinylidene chloride (PVDC), polyester, PVDC coated polyester, oriented and non-orientated polyethylene and polypropylene film, metallic foils and metallized films; and flexible cellular material such, for example, as polyurethane foams or sponge rubber. The laminates can be made of similar or dissimilar laminae and are useful in a wide variety of end-use applications including, for example, flexible packaging, graphic arts and industrial uses such, for example, as weather stripping and electrical insulation.

The packaging industry, particularly the food packaging area thereof, is currently utilizing large quantities of flexible films. Since all the properties desired in such laminates are not available in any one specific film, the industry generally employs laminates prepared from a combination of films. Very often these laminates are formed from a film of polyethylene terephthalate (PET), polyamide or cellophane, either uncoated or coated with PVDC laminated to a heat sealable polyolefin film which has been treated by corona discharge for adhesion promotion.

In the prior art, the most satisfactory laminates as indicated by industry acceptance have been formed with organic solvent based urethane or polyester adhesives. Most of these adhesives, however, have the disadvantage of requiring organic solvents such as methyl ethyl ketone, ethyl acetate or alcohol in order to form an applicable solution. Due to the desirability of eliminating solvents from such adhesives because of their increasing cost, flammability, as well as pollution considerations, the development of an aqueous emulsion adhesive system capable of performing comparably to the solvent adhesives becomes vital to the continued growth of the industry.

Water-borne laminating adhesives have been described in the prior art. For example, U.S. Pat. No. 3,905,931 issued Sept. 16, 1975, describes one-part adhesives using an aqueous emulsion of a poly(ethyl acrylate), an ethylene-acrylic acid copolymer and a 1,2-epoxy resin. Other water-borne, two-part laminating adhesives are known and have been described as based on an aqueous dispersion of (a) a copolymer of a vinyl ester and/or an acrylic acid ester and/or further copolymerizable monomer(s), (b) an epoxy resin, and (c) an amine hardener catalyst.

The adhesives noted above employing an amine hardener catalyst are characterized as two-part adhesives, i.e., they are sold in two parts and must be combined in specified amounts by the user prior to their use in the laminating process. The packaging and selling of these adhesives in two parts (a component comprising an epoxy resin or epoxy resin and vinyl polymer and separate amine catalyst component) is necessary because of the inherent reactivity and instability of the adhesive when the two components are combined. Typically a completed adhesive where the components have been combined exhibits a pot-life of less than 24 hours.

Because of the many inconveniences and disadvantages associated with the two-component adhesives, there is considerable industry interest in stable one-part, ready-for-use laminating adhesives which eliminate formulation and pot-life problems. While aqueous dispersion, one-part adhesives lacking epoxy resin are known and currently sold to the industry, laminations produced with these products have little or no water resistance and very low humidity resistance.

Accordingly, there is still a need in industry for a water-borne, one-part laminating adhesive which in use exhibits bond strength, water and humidity resistance equal to the current two-part adhesives.

SUMMARY OF THE INVENTION

The present invention provides one-part laminating adhesive compositions which incorporate acrylic polymer prepared by a "core-shell" emulsion polymerization process. We have found that the resultant adhesive compositions employing polymers which have polymer particles having a core portion surrounded by a shell portion have excellent bond strength, and water and humidity resistance equal to prior art two-part adhesives employing epoxy resin.

The monomers useful for preparing the acrylic polymer employed in the adhesives herein are selected to provide a core-shell polymer where the core and shell polymer both will have a Tg of about $-10°$ to $-35°$ C. The weight ratio of core to shell monomers employed in preparing the polymer will range from about 2:1 to 5:1, with preferred ratios ranging from 3:1 to 4:1. The copolymer composition is selected to contain a specific combination of monomers within defined ranges.

The core portion is formed to contain a functional comonomer selected from the group of glycidyl methacrylate, an amine-containing comonomer, and acrylic or methacrylic acid. The shell portion is formed to contain a complementary functional comonomer, i.e., a comonomer which is reactive after film formation and drying with the functional comonomer used in the core, which comonomer is selected from the group of functional comonomers useful in the core. In selecting these functional comonomers, it is important that they be selected as reactive pairs: the same functional comonomer cannot be used in both the core and shell. For example, glycidyl methacrylate in the core can be used with acrylic or methacrylic acid, or amine-containing monomer in the shell. Likewise, an amine-containing monomer in the core can be used with glycidyl acrylate (or methacrylate) or acrylic or methacrylic acid in the shell.

The polymeric core comprises a copolymer of:
(a) from 60 to 98% by weight of an acrylic or methacrylic acid alkyl or hydroxyalkyl ester monomer containing 1 to 12 carbon atoms in the alkyl portion or mixture of such esters,
(b) from 0 to about 38% by weight of a vinyl ester of an alkanoic acid containing from 1-13, preferably 2-3, carbon atoms, and
(c) from 2 to 12%, preferably 3 to 5%, by weight of a functional comonomer selected from glycidyl methacrylate, acrylic or methacrylic acid, and an amine-containing copolymerizable comonomer.

The polymeric shell comprises a copolymer of:

(a) from 70 to 98% by weight of an acrylic or methacrylic acid alkyl or hydroxyalkyl ester monomer containing 2 to 12 carbon in the alkyl portion or mixture of such esters, (b) from 0 to about 28% by weight of a vinyl ester of an alkanoic acid containing from 1-13, preferably 2-3, carbon atoms and (c) from 2 to 12%, preferably 3 to 5%, by weight of a functional comonomer selected from glycidyl methacrylate, acrylic acid or methacrylic acid, and an amine-containing copolymerizable comonomer, provided that the functional comonomer employed in the core is reactive with the functional comonomer employed in the shell. The noted percentages apply to the core and shell copolymers, separately.

Thus, according to the present invention, there is provided an adhesive composition which is based on an acrylic copolymer comprising a core and shell in which a latently reactive, functional comonomer (for example, glycidyl methacrylate) is placed in the core and a second functional comonomer reactive with the first comonomer is placed in the shell. When the composition is used, it is understood that the heat from the "nip" step employed in the laminating process is sufficient to permit the functional comonomers to react with one another and thereby to initiate hardening, ionic bonding or crosslinking of the polymer. The core-shell technology is used herein to effectively separate the reactive functional comonomers until such time as reactivity is desired.

DETAILED DESCRIPTION OF THE PREFERRED EMBODIMENTS

A representative adhesive of the invention is prepared in emulsion form wherein the polymeric core particles will include acrylic polymer with copolymerized glycidyl methacrylate or acrylic acid. The outer layer or shell will include acrylic polymer having, for example, a copolymerized amine terminated comonomer. For purposes of this invention, where the term glycidyl methacrylate is used it will be understood that the term is intended to also mean and include glycidyl acrylate. The production of such copolymer emulsion relies on a polymerization process which includes successive additions of specific monomer charges.

Acrylic comonomers useful for both the core and shell portions are $C_1$-$C_{12}$ esters of acrylic and methacrylic acids including but not limited to methyl acrylate, ethyl acrylate, n-butyl acrylate, isobutyl acrylate, n-propyl or iso-propyl acrylate, 2-ethylhexyl acrylate, as well as the corresponding methacrylates. The acrylic or methacrylic acid esters may include a hydroyalkyl group in place of the alkyl group. Thus, hydroxyalkyl acrylates such as, for example, 3-hydroxyethyl acrylate, 2-hydroxypropyl acrylate, 3-hydroxypropyl acrylate, and 3-hydroxyethyl methacrylate are also useful herein. Mixtures of compatible (meth)acrylate monomers may also be used.

Vinyl ester monomers may optionally be included in the core-shell monomer charges. Useful monomers include vinyl esters of an alkanoic acid containing from 1-13 carbon atoms, although vinyl acetate and vinyl propionate are preferred. Vinyl versatate, a branched vinyl ester containing 10 carbon atoms, is also a preferred monomer. Other vinyl esters which may be utilized herein include vinyl butyrate, vinyl valerate, vinyl pivalate, vinyl nonate, etc. Particularly with all acrylic systems, small amounts (up to about 12% by weight) of other copolymerizable comonomers may also be included in the monomer charges. Examples of such optional comonomers are styrene, alpha-methyl styrene, acrylonitrile, vinyl ethers, vinyl chloride, vinylidene chloride, fumarates and maleates. Optionally, with respect to the vinyl ester monomer used in the core and shell, up to about 30% of that monomer (for example, vinyl acetate) may be replaced with ethylene so that the resultant acrylate copolymer includes an interpolymerized ethylene/vinyl acetate component. The replacement can be effected in the core or shell or in both copolymers. The choice of the particular monomer(s) is largely dependent upon the requirements of the desired end-use of the adhesive. One skilled in the art would be able to select monomers and relative proportions which, for example, will produce a softer or harder copolymer, as desired.

As was described above, the core will include 2 to 12%, preferably 3 to 5% of glycidyl methacrylate or the same amount of acrylic or methacrylic acid or a copolymerizable amine-containing comonomer. Depending on the functional comonomer selected for use in the core portion of the polymer, the shell will contain a complementary reactive comonomer. For example, when glycidyl methacrylate is employed in the core, either an amine-containing comonomer or acrylic (or methacrylic acid) can be used in the shell. When the amine-containing comonomer is used in the core portion, either glycidyl methacrylate or acrylic acid or methacrylic acid is used in the shell portion. Useful amine-containing copolymerizable monomers include any known monomers containing an amine functional group which are compatible with the acrylic systems described herein. Particularly useful are dimethylaminoethyl methacrylate (DMAEMA), tert-butylaminoethyl methacrylate, dimethylaminopropyl methacrylamide.

The free radical donors (initiators) used to initiate the copolymerization can be selected from any of the initiators for aqueous emulsion copolymerization known in the art including those which undergo scission under the influence of heat and those which are caused to form free radicals by reaction with reducing agents. Water-soluble initiators are usually to be preferred including potassium persulfate, ammonium peroxydiphosphate, azo types such as 2,2'-azo bisamidino-propane hydrochloride, hydrogen peroxide, and others which will be known to those skilled in the art. When reducing agents are used, it is preferred to use water soluble materials such as sodium formaldehyde sulfoxylate, sodium metabisulfite and ascorbic acid. The amounts to be used depend upon the desired rate of polymerization and upon other factors well known in the art. Preferably the aqueous emulsion composition contains between 0.1 and 10 percent, especially from about 0.2 to 2 percent by weight of initiator. If a reducing agent is used, it also is used in an amount between 0.1 and 5 percent, especially from 0.2 to 2 percent by weight of the finished emulsion. Those skilled in the art will recognize that the amount of initiator used may vary depending upon the particular initiator employed as well as the molecular weight of the polymer desired.

The polymerization process for preparing the polymer emulsions herein is conducted according to standard emulsion polymerization procedures employing successive monomer charges. A representative polymerization process involves at least two distinct stages: the first incorporating the comonomers for the core portion of the polymer and the second incorporating the comonomers for the shell portion of the polymer. The many parameters of emulsion polymerization technique can be adjusted by those skilled in the art to obtain particular desired results. Initiator can also be added according to a variety of possible schedules. Thus one or more of the comonomers can be emulsified first in the stirred aqueous phase before initiation is begun. Monomers can be added continuously or in staggered increments. Additionally, a polymerization can be started in the presence of a previously prepared seed.

In the production of core-shell polymer, it is important that the surfactant system is designed to minimize or eliminate new particle formation during the second stage, i.e., polymerization of the shell. Ordinarily this is accomplished by having the core polymerization include all the micelle-forming surfactant (emulsifier), generally anionic surfactant. Typical useful surfactants (micelle-forming) for this stage include sodium lauryl sulfate, sodium lauryl ether sulfate, sodium dodecylbenzene sulfonate and sulfosuccinate esters. Other stabilizing surfactants (ordinarily non-ionic), such as ethoxylated alkyl phenols or ethoxylated lauryl alcohol may be used in conjunction with the micelle-forming surfactants in the core polymerization. In the shell polymerization stage the surfactant may be eliminated entirely or stabilizing, non-ionic surfactant(s) may be employed. Thus, in designing particular polymerization reaction sequences, the core polymerization should be conducted to promote polymer particle formation, while the subsequent shell polymerization should promote polymer formation on the core surface. At this time the inventors have no evidence that the "core-shell" copolymers herein will contain a definitive interface between the core and shell. In the multistage polymerization process employed in the present invention, the process is designed to first favor production of polymeric core particles followed by the polymerization of shell particles. For purposes of this invention, the "core-shell" copolymers described and produced by the multistage process herein are intended to include those copolymers which possess a core and shell and also those copolymers which possess a core and shell and an intermediate component. All of the copolymers useful in the invention herein will possess the latent reactivity of the functional comonomers polymerized therein. Core-shell polymerization is described in U.S. Pat. No. 4,091,162 issued May 23, 1978 to Smith & McLaurin Limited and is incorporated by reference herein.

The emulsion is generally prepared at a solids content of about 40 to 65% by weight and, prior to use, is diluted with alcohol or alcohol and water to a final solids content of about 15–45%. In so doing it is preferred to add 15 to 20 parts alcohol per 100 parts (wet) interpolymer emulsion, so as to provide for adequate wetting of the substrate to be coated without the necessity for the use of any externally added surfactant. Any water-miscible, sufficiently volatile primary or secondary alcohol compatible with the adhesive including ethyl, n-propyl, isopropyl, isobutyl or n-butyl alcohol may be used.

In addition to the components described above, additives which are conventionally used in laminating adhesives may also be included. Such additives include, for example, defoamers (preferably non-silicone types), salts, organic solvents, humectants, etc. These additives, if used, are present in conventional concentrations well known to those skilled in the art.

The laminates of the present invention may contain laminae of a wide variety of flexible materials. Thus suitable laminae include films of polyethylene and polypropylene generally treated for adhesion promotion; also polyester such as polyethylene terephthalate, cellophane and polyamide which may or may not be coated with PVDC for improved barrier properties. Preferably, dissimilar laminae are used where films, for example, of corona treated polypropylene or polyethylene are bonded to polyester, polyamide or PVDC coated cellophane or PVDC coated polyester, or paper. Also contemplated within the present invention are laminates prepared with woven and non-woven fabrics where the fibers are of cotton, polyester, polyolefin, polyamide, polyimide and the like; metallic foils such as aluminum foil; metallized films; paper and paperboard; and cellular flexible sheet material such as polyethylene or polyurethane foam, and sponge and foam rubber.

In forming the laminates of the present invention, conventional techniques known per se are employed to apply the adhesive emulsion to the film substrate. Thus, these adhesives may be applied by use of any mechanical coating process such as air knife, trailing blade, knife coater, reverse roll or gravure coating technique. Most commonly, the adhesive is coated on a film and allowed to dry at room temperature (or dried at moderate heat). The adhesive coated film is then laminated to the desired substrate, for example, a corona treated polyethylene or polypropylene film or other lamina by passing through a "hot nip" roller. The resultant laminate is characterized by the immediate formation of a strong bond which gains strength on room temperature (R.T.) standing resulting from the polymeric hardening or curing.

Set forth below are working examples which serve to illustrate the invention. All parts and percentages are by weight unless otherwise indicated.

EXAMPLE I

This example illustrates the preparation of an emulsion of core-shell polymer (core-shell ratio of 4:1) useful in the present invention. The various charges employed in the polymerization summarized below.

| Initial Charge | Parts |
| --- | --- |
| Water, distilled | 350.0 |
| Emulsifier (Triton X-405) (Rohm & Hass) | 3.0 |
| Emulsifier (Triton X-45) (Rohm & Hass) | 2.0 |
| Initiator (V-50) (Wako Chemical Co.) | 1.0 |
| Charge 2 (Core) | |
| Vinyl acetate | 35.0 |
| Butyl acrylate | 5.0 |
| Charge 3 (Core) (Slow-addition) | |
| Water, distilled | 120.0 |
| Triton X-405 | 30.0 |
| Triton X-45 | 6.0 |
| DMAEMA | 16.0 |
| Vinyl acetate | 45.0 |
| Butyl acrylate | 315.0 |
| Charge 4 (Slow-addition) | |
| Water, distilled | 50.0 |
| Initiator V-50 | 2.5 |
| Charge 5 (Shell) (Slow-addition) | |
| Vinyl acetate | 15.0 |
| Butyl acrylate | 85.0 |
| Acrylic acid | 3.0 |
| Charge 6 | |

| -continued | |
| --- | --- |
| Initial Charge | Parts |
| t-Butyl hydroperoxide | 0.5 |
| Water, distilled | 0.5 |
| Charge 7 | |
| Sodium bisulfite | 0.5 |
| Water, distilled | 5.0 |

The above polymer was designated "A". An additional polymer, designated "B" was prepared using the same components except that the 16 parts of DMA-EMA used in the first polymer was replaced with 16 parts of tert-butylaminoethyl methacrylate.

The procedure (for both polymers) was conducted according to the following.

The flask containing the initial charge was purged with nitrogen. Charge 2 was added to the flask at R.T. and the mixture was heated to about 70° C. with stirring.

After polymerization started (5-10 min.), the slow-addition of Charge 3 and Charge 4 was started and continued slowly. Charge 3 was added uniformly over a period of 3 hours while Charge 4 was added uniformly over a period of 4 hours. The temperature was maintained at 70°-75° C. When the addition of Charge 3 was completed, the addition of Charge 5 was started and continued uniformly over a period of 1 hour. At the end of these additions, the reaction mixture was held at 70°-75° C. for 45-60 minutes. In order to minimize residual monomer, Charge 6 was added, and after 5 minutes Charge 7 was added and the mixture was stirred for an additional 10 minutes. The mixture was then cooled to R.T. and produced a latex having the following properties:

| | Polymer | |
| --- | --- | --- |
| | A | B |
| Solids (%) | 45.9 | 45.6 |
| pH | 4.8 | 5.1 |
| Particle size (nm) | 233 | 291 |
| Viscosity (cps) | 78 | 22 |

The two adhesive emulsions, without formulation, except for diluting to 35 to 40% solids with isopropyl alcohol/water (a 70/30) mixture, were evaluated as indicated using procedures described below.

Peel Adhesion (bond strength test)

An Instron testing unit (Tensile Tester) was run at a rate of 12 inches per minute to pull apart a one-inch wide strip of the laminate prepared with the test adhesive. The force needed is shown in grams. Preferably, the adhesive should cure to "tear", i.e., one of the film substrates should rupture instead of the films separating or delaminating. Bond strength readings were made of (a) the initial bond, and (b) after 7 days at R.T., and (c) after 7 days at R.T. followed by 24 hours in water, and (d) after 7 days at R.T. and 24 hours at 100% relative humidity at 100° F. (38° C.).

In the test procedures, an additional two-part, laminating emulsion adhesive comprising vinyl polymer, epoxy resin and amine catalyst used commercially, designated here as "LA", was run to serve as a reference in evaluating the test results. The three adhesives were coated (coating weight about 1.5 lbs. per ream) on the surface of LBT Mylar (0.5 mil) sold by E. I. duPont de Nemours, dried to remove the water and hot nipped at about 120° F. (50° C.) to a film of low density polyethylene (0.5 mil). Testing results are summarized in Table I.

TABLE I

| | PEEL STRENGTH | | | |
| --- | --- | --- | --- | --- |
| Adhesive Polymer | Initial | 7 Days | 7 Days + 24 hr. HOH | 7 Days + 24 hr. 100% rel. humidity 100° F. |
| LA | 260 g | 276 g | 8 g | 24 g |
| A | 214 g | 388 g | 104 g | 161 g |
| B | 251 g | 250 g | 116 g | 226 g |

EXAMPLE II

In this example, preparation of additional core-shell polymer emulsions useful in the invention are illustrated. The charges employed in the preparation of Polymer C having a core-shell ratio of 4:1 are summarized below.

| Initial Charge | Parts |
| --- | --- |
| Water, distilled | 1260.0 |
| Emulsifier (Triton X-405) | 7.5 |
| Emulsifier (Triton X-45) | 4.5 |
| Initiator V-50 | 1.8 |
| Charge 2 (Core) | |
| Vinyl acetate | 75.0 |
| Butyl acrylate | 15.0 |
| Charge 3 (Core) | |
| Water | 330.0 |
| Emulsifier (Triton X-405) | 90.0 |
| Emulsifier (Triton X-45) | 18.0 |
| DMAEMA | 46.0 |
| Vinyl acetate | 405.0 |
| Butyl acrylate | 705.0 |
| Charge 4 | |
| Water, distilled | 150.0 |
| Initiator V-50 | 5.5 |
| Charge 5 (Shell) | |
| Butyl acrylate | 255.0 |
| Vinyl acetate | 45.0 |
| Acrylic acid | 15.0 |
| Charge 6 | |
| t-Butyl hydroperoxide | 1.5 |
| Charge 7 | |
| Water, distilled | 15.0 |
| Sodium bisulfite | 1.5 |

The polymerization procedure was conducted substantially as described for the polymers of Example I yielding a latex having the following properties:

Solids(%): 45.6
pH: 4.8
Particle size (nm): 190
Viscosity (cps): 56

Another latex of the invention designated Polymer D was prepared according to the same procedure and composition except that in Charge 5, the 15 parts of acrylic acid was replaced with 15 parts of glycidyl methacrylate. Polymer D showed the following properties:

Solids %: 45.5
pH: 5.6
Particle size (nm): 190
Viscosity (cps): 83

Another latex having a core-shell ratio of 3:1, designated Polymer E, was prepared according to the same procedure and similar composition except that in Charge 3, the amounts of the monomers were changed to:

DMAEMA: 43.0 parts
Vinyl acetate: 265.0 parts
Butyl acrylate: 770.0 parts and in Charge 5, the monomers were increased to:

Butyl acrylate: 300.0 parts
Vinyl acetate: 75.0 parts
Acrylic acid: 18.8 parts

A further latex having an all acrylic core and a core-shell ratio of 4:1, designated Polymer F, was prepared according to the same procedure and composition except that in Charge 2, the vinyl acetate and butyl acrylate monomers were replaced with 90 parts of butyl acrylate. In Charge 3, the vinyl acetate and butyl acrylate were replaced with 990 parts of butyl acrylate and 120 parts of methyl methacrylate.

The four polymer emulsions were diluted to about 40% solids with an isopropanol/water (70/30) mixture and were evaluated for peel strength as in Example I. Testing results are summarized in Table II.

TABLE II

| | PEEL STRENGTH | | | |
|---|---|---|---|---|
| Adhesive Polymer | Initial | 7 Days | 7 Days + 24 hr. HOH | 7 Days + 24 hr. 100% rel. humidity 100° F. |
| C | 191 g | 186 g | 32 g | 80 g |
| D | 68 g | 128 g | 7 g | 10 g |
| E | 307 g | 187 g | 22 g | 30 g |
| F* | 52 g | 354 g | 145 g | 186 g |
| LA | 200 g | 353 g | 15 g | 95 g |

*Results were obtained in a separate test run.

The results indicate the polymers to have adequate peel strength in dry, moist and wet conditions.

EXAMPLE III

This example illustrates the end-use adhesive advantages obtained by employing a core-shell polymer prepared by the multistage polymerization process described herein as compared to a similar copolymer composition prepared by conventional emulsion polymerization.

A core-shell polymer (core-shell ratio of 4:1) was prepared from the following charges:

| Initial Charge | Parts |
|---|---|
| Water, distilled | 350.0 |
| Triton X-405 | 3.0 |
| Triton X-45 | 2.0 |
| Initiator V-50 | 1.0 |
| Charge 2 (Core) | |
| Vinyl acetate | 35.0 |
| Butyl acrylate | 5.0 |
| Charge 3 (Core) Slow-addition | |
| Water, distilled | 120.0 |
| Triton X-405 | 30.0 |
| Triton X-45 | 6.0 |
| DMAEMA | 9.6 |
| Vinyl acetate | 125.0 |
| Butyl acrylate | 235.0 |
| Charge 4 | |
| Water, distilled | 50.0 |
| Initiator V-50 | 2.5 |
| Charge 5 (Shell) Slow-addition | |
| Vinyl acetate | 40.0 |
| Butyl acrylate | 60.0 |
| Glycidyl methacrylate | 1.0 |
| Charge 6 (Shell) | |
| Tert-butyl hydroperoxide | 0.5 |
| Water | 0.5 |
| Charge 7 (Shell) | |
| Sodium bisulfite | 0.5 |
| Water | 5.0 |

The polymerization procedure was conducted according to the procedure described in Example I. The polymer was designated "AA".

For comparison, a similar copolymer, designated "BB", was prepared by a conventional polymerization which yielded a polymer which was not a core-shell polymer from the following charges:

| Initial Charge | Parts |
|---|---|
| Water, distilled | 350.0 |
| Triton X-405 | 3.0 |
| Triton X-45 | 2.0 |
| Initiator V-50 | 1.0 |
| Charge 2 | |
| Vinyl acetate | 35.0 |
| Butyl acrylate | 5.0 |
| Charge 3 | |
| Water, distilled | 120.0 |
| Triton X-405 | 30.0 |
| Triton X-45 | 6.0 |
| DMAEMA | 15.0 |
| Vinyl acetate | 165.0 |
| Butyl acrylate | 295.0 |
| Glycidyl methacrylate | 5.0 |
| Charge 4 | |
| Water, distilled | 50.0 |
| Initiator V-50 | 2.5 |
| Charge 5 | |
| t-Butyl hydroperoxide | 0.5 |
| Water distilled | 0.5 |
| Charge 6 | |
| Sodium bisulfite | 0.5 |
| Water, distilled | 5.0 |

In carrying out this polymerization, the flask containing the initial charge was purged with nitrogen. Charge 2 was added at R.T. and the mixture was heated to about 70° with stirring. After polymerization started (5–10 minutes), a slow-addition of Charge 3 and Charge 4 was started and continued slowly over a period of 4 hours. The temperature was maintained at 70°–75° C. for 45 to 60 minutes, after which time Charge 5 was added and after about 5 minutes Charge 6 was added and the mixture was stirred for an additional 10 minutes, and thereafter was cooled to R.T. Polymers AA and BB exhibited the following properties:

| | Polymer | |
|---|---|---|
| | AA | BB |
| Solids (%) | 47.8 | 47.0 |
| pH | 5.1 | 3.8 |
| Particle size (nm) | 217 | 254 |
| Viscosity (cps) | 92 | 258 |

The two emulsions, without formulation, except for diluting to about 40% solids using an isopropanol/water (70/30) mixture, were employed in preparing laminates of Mylar (50M24) and low density polyethylene (0.5 mil) and evaluated for peel adhesion.

Testing results are summarized in Table III.

TABLE III

| Adhesive Polymer | PEEL STRENGTH | | |
|---|---|---|---|
| | Initial | 7 Days | 7 Days + 24 hr. HOH |
| AA | 279 g | 306 g | 121 g |
| BB | 230 g | 235 g | 32 g |
| CC* | 272 g | 319 g | 4 g |

*CC is a one-part commercially used laminating adhesive which does not contain epoxy.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed is:

1. A laminating adhesive in aqueous emulsion form comprising a core-shell polymer in aqueous emulsion form consisting essentially of a core copolymer of:
   (a) from 60 to 98% by weight of an acrylic or methacrylic acid alkyl or hydroxyalkyl ester monomer containing 1 to 12 carbon atoms in the alkyl portion or mixture of such esters,
   (b) from 0 to about 38% by weight of a vinyl ester of an alkanoic acid containing from 1–13 carbon atoms, and
   (c) from 2 to 12% by weight of a functional comonomer selected from glycidyl methacrylate, acrylic or methacrylic acid, and an amine-containing copolymerizable comonomer, and a shell copolymer of:
   (a) from 70 to 98% by weight of an acrylic or methacrylic acid alkyl ester monomer containing 1 to 12 carbon atoms in the alkyl portion or mixture of such esters,
   (b) from 0 to about 28% by weight of a vinyl ester of an alkanoic acid containing from 1–13 carbon atoms, and
   (c) from 2 to 12% by weight of a functional comonomer selected from glycidyl methacrylate, acrylic acid or methacrylic acid, and an amine-containing copolymerizable comonomer; wherein the core-shell polymer has a Tg of $-10°$ to $-35°$ C., the weight ratio of core to shell monomers employed in preparing the polymer ranges from 2:1 to 5:1 and the functional comonomer employed in the core differs from and is latently reactive with the functional comonomer employed in the shell.

2. The laminating adhesive of claim 1, wherein the core-shell polymer has a Tg of $-10°$ to $35°$ C. and the acrylic or methacrylic acid alkyl or hydroxyalkyl ester is selected from the group of ethyl acrylate, propyl acrylate, butyl acrylate, 2-ethylhexyl acrylate, hydroxyethyl acrylate, hydroxypropyl acrylate, and hydroxyethyl methacrylate.

3. The laminating adhesive of claim 2, wherein the vinyl ester is selected from the group vinyl acetate, vinyl propionate, vinyl butyrate, vinyl valerate, vinyl pivalate, vinyl nonate and vinyl versatate.

4. The laminating adhesive of claim 1, wherein the core-shell polymer, the weight ratio of core to shell monomers employed in preparing the polymer ranges from 3:1 to 4:1.

5. The laminating adhesive of claim 4, wherein the functional amine-containing comonomer employed in the core or the shell copolymer is selected from the group of dimethylaminoethyl methacrylate, tert-butylaminoethyl methacrylate and dimethylaminopropyl methacrylamide.

6. The laminating adhesive of claim 4, wherein the functional comonomer employed in the core copolymer is glycidyl methacrylate or dimethylaminoethyl methacrylate.

* * * * *